INVENTOR.
ABRAHAM B. KEHR
BY
Caesar and Rivise
ATTORNEYS.

INVENTOR.
ABRAHAM B. KEHR
BY Caesar and Rivise
ATTORNEYS

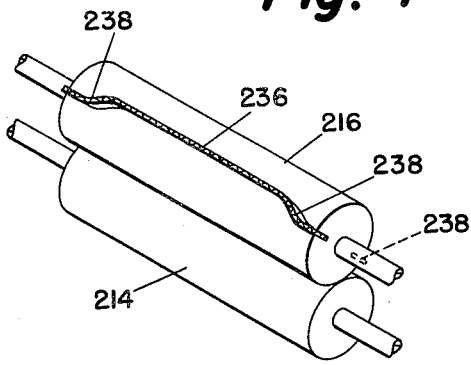
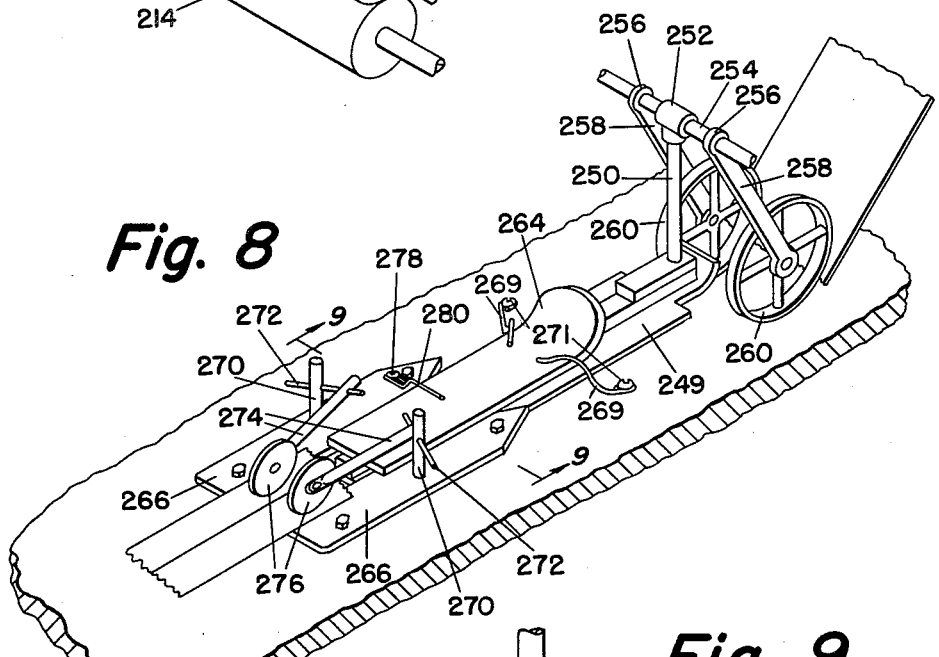
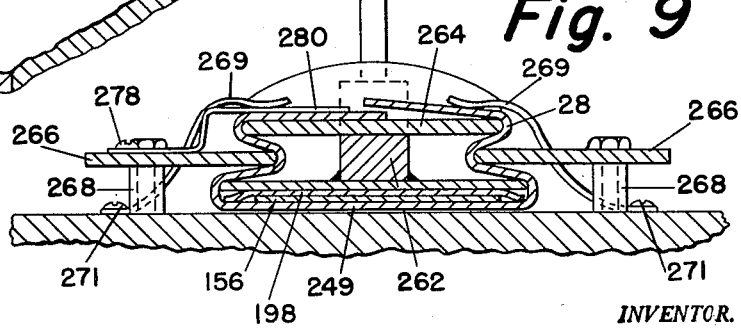

Feb. 2, 1965    A. B. KEHR    3,168,016
METHOD AND APPARATUS FOR PLACING SEALED-IN INSERTS
ON PACKAGING MATERIAL
Filed Aug. 1, 1962    7 Sheets-Sheet 6

INVENTOR.
ABRAHAM B. KEHR
BY
Caesar and Rivise
ATTORNEYS

INVENTOR.
ABRAHAM B. KEHR
BY
Caesar and Rivise
ATTORNEYS.

United States Patent Office 3,168,016
Patented Feb. 2, 1965

3,168,016
METHOD AND APPARATUS FOR PLACING SEALED-IN INSERTS ON PACKAGING MATERIAL
Abraham B. Kehr, 1414 Highland Ave., Abington, Pa.
Filed Aug. 1, 1962, Ser. No. 216,701
13 Claims. (Cl. 93—8)

This invention relates to a pocketed bag forming machine, and it particularly relates to a machine for making pocketed bags having cards or similar inserts sealed within the pockets.

This application is a continuation-in-part of my co-pending application Serial No. 45,712, filed July 27, 1960, now abandoned.

A major commercial item today are ice-cream sticks, ice-cream sandwiches, ice popsicles and the like. The vending of these items may take place through stores, roadside stands, ice-cream trucks and other mediums. Regardless of how these items are vended, however, for sanitary reasons they are generally wrapped in paper bags which are removed by the consumer.

Since these ice-cream vendors deal primarily with children, it has been found commercially advisable to appeal especially to children. One manner of such appeal is to provide picture cards and the like within the bags, these cards being of a type which would especially interest children and also being, in many cases, of an educational nature. However, these cards must be isolated from the product itself to avoid contamination of the product and damage to the cards.

The aforesaid isolation is obtained by positioning the cards within sealed pockets on the bags. Nevertheless, any attempt to manually insert the cards in the pockets and then seal them would be commercially infeasible. Consequently, machines have heretofore been developed to form such bags with sealed-in inserts. However, such prior machines have generally been not only too complex, difficult to operate and subject to easy breakdown but have also not been as efficient for the purpose as would be commercially desirable.

It is, therefore, one object of the present invention to provide a machine for forming pocketed bags with sealed-in inserts which is relatively easy to operate, not overly complex and yet highly efficient for its intended purpose.

Another object of the present invention is to provide a machine of the aforesaid type which greatly decreases the cost of operation and which is not subject to easy breakdown.

A further object of this invention is to provide a machine and method for forming bags and other containers with sealed-in inserts.

Other objects and many of the attendant advantages of this invention will be readily appreciated as the same becomes better understood by reference to the following detailed description when considered in connection with the accompanying drawings wherein:

FIG. 2A is a fragmentary end view of the chain drive mechanism taken substantially on line 2A—2A of FIG. 2 with parts of the machine omitted.

FIG. 7 is an enlarged, detailed perspective view of the serrating means.

FIG. 8 is an enlarged, detailed perspective view of the pleat forming means.

FIG. 9 is a sectional view taken on line 9—9 of FIG. 8.

FIG. 15 is a top perspective view, partly broken away, of a completed bag unit formed by the machine embodying the present invention.

FIG. 16 is a cross-sectional view taken on line 16—16 of FIG. 15.

Figure 1:
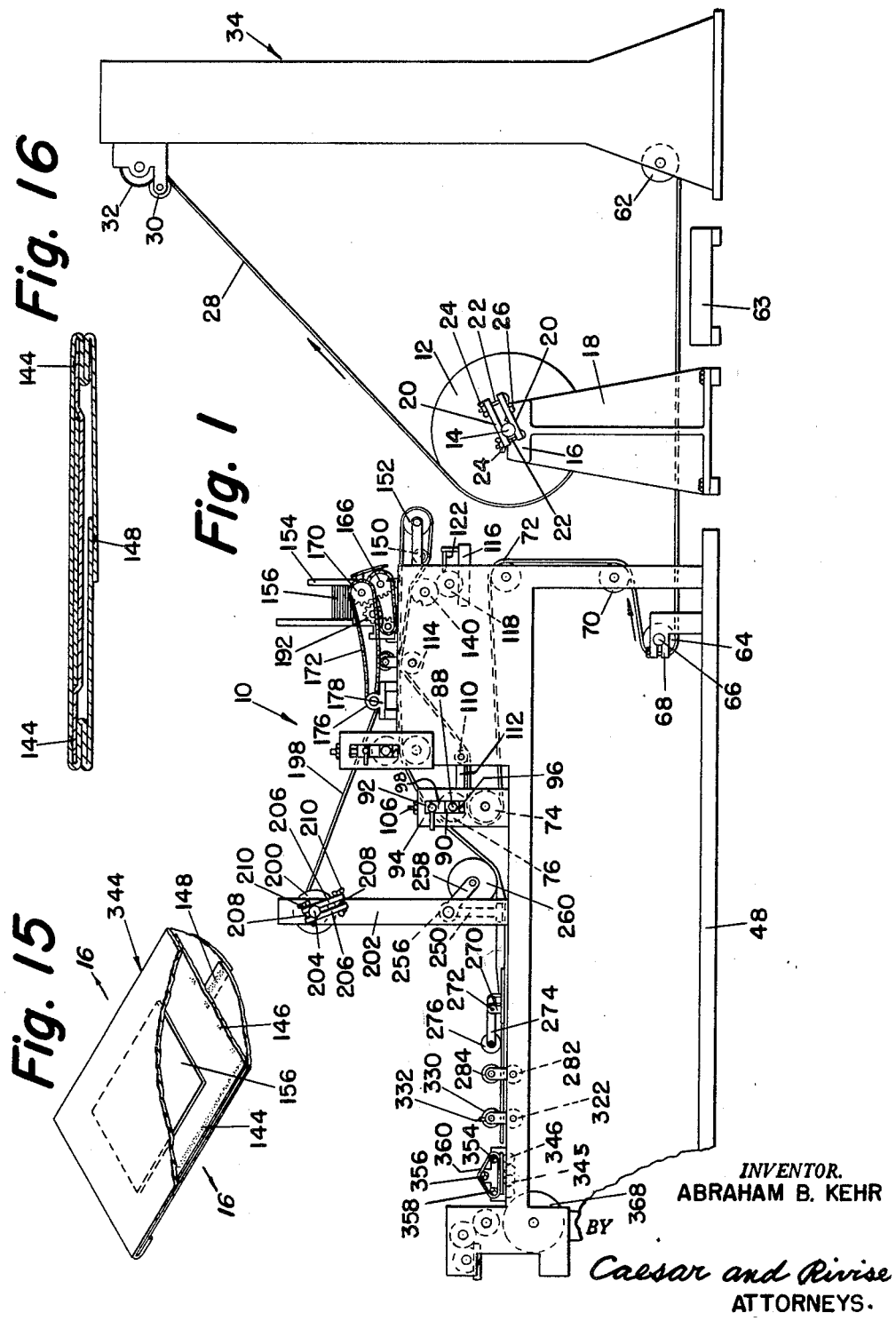
FIG. 1 is a side elevational view of the essential elements of a machine embodying the present invention.

Referring now in greater detail to the various figures of the drawings wherein similar reference characters refer to similar parts, there is shown a machine, generally designated 10, comprising a feed roll 12 mounted on a shaft 14 which is rotatably journaled in bearings 16 on a standard 18. A clamp, comprising a pair of clamping plates 20 adjustably held together by bolts 22 and wing nuts 24, is held on the end shaft 14 and abuts against a stop pin 26 on the standard. This clamp serves as an adjustable drag control means for the feed roll 12, the drag effect being varied by tightening or loosening the clamp on the shaft.

Figure 2:
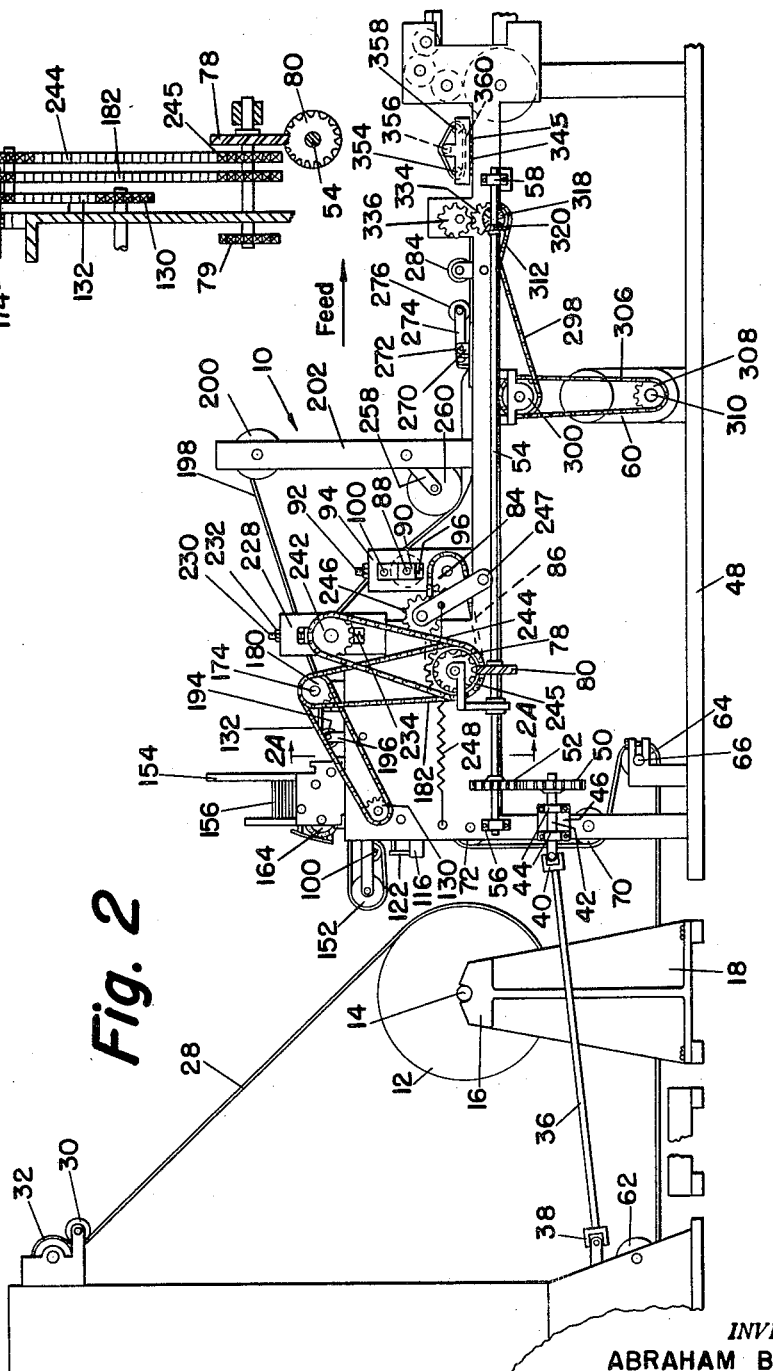
FIG. 2 is a view similar to FIG. 1 but taken from the opposite side of the machine.

The feed roll 12 holds a coiled strip of paper 28 which, in the functioning of the machine, passes between guide rollers 30 and 32 on the upper end of a printer generally designated 34. The printer 34 is a standard type and will therefore not be illustrated here in any detail. However (as shown in FIG. 2), the drive for the printer is provided by a shaft 36 having universal joints 38 and 40 at its opposite ends. The joint 40 is connected to a shaft 42 journaled in ball bearings 44 on a bracket 46 mounted on the frame 48.

The shaft 42 is provided with a gear 50 in mesh with a gear 52 on a through or main drive shaft 54. The shaft 54 is journaled at its opposite ends in bearings 56 and 58 on the frame 48. It is driven from a motor 60 in a manner to be hereinafter more fully described.

At the bottom of the printer 34 is a roller 62 over which the sheet 28 travels in its passage over an open gas-flame ink-dryer 63 and toward a roller 64 which is mounted on a shaft 66 adjustable within a slotted bracket 68 on the frame 48. The roller 64 serves to take the slack out of the strip of paper and to change its direction so that it then passes up over a pair of vertically spaced rollers 70 and 72. From roller 72 the strip passes between feed rolls 74 and 76.

The roll 74 is positively driven by means of a gear 78 in mesh with a gear 80 on the main drive shaft 54 (see FIG. 2). The gear 78 is coaxially connected to a sprocket 79, (as shown in FIG. 2A) which is drivingly connected to a sprocket 84 by an endless chain 86. The sprocket 84 is coaxially connected to the roll 74.

Figure 3:
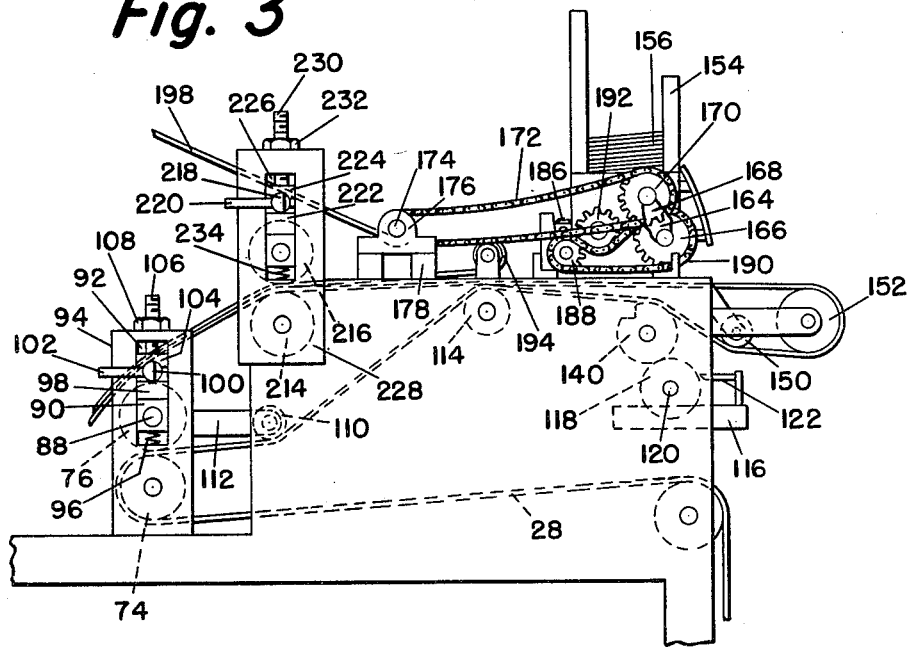
FIG. 3 is an enlarged view of a portion of the machine as shown in FIG. 1.

The axis of roll 76 is set a predetermined distance away from the axis of roll 74 to provide a constant pressure thereto. This distance may be varied because the shaft 88 of the roll 76 is journaled in opposite bearing blocks 90, each block being slidable in a corresponding vertical slot 92 in a corresponding bracket 95 (as best seen in FIG. 3).

The blocks 90 are urged upwardly by springs 96 but are adapted to overcome the force of the springs under the compression of a cam block 98 actuated by a cam 100 on a transverse shaft 101. The cam is provided with a handle 102. The cam 100 is positioned between a lower block 98 and an upper block 104. Upward movement is further limited by an adjustable threaded limit rod 106 extending through the top of each bracket 94 and held by a lock nut 108. The springs 96 are primarily used to release the pressure between the rolls when it is desired to feed the end of a strip between the rolls or it is desired to clean the rolls.

Figure 5:
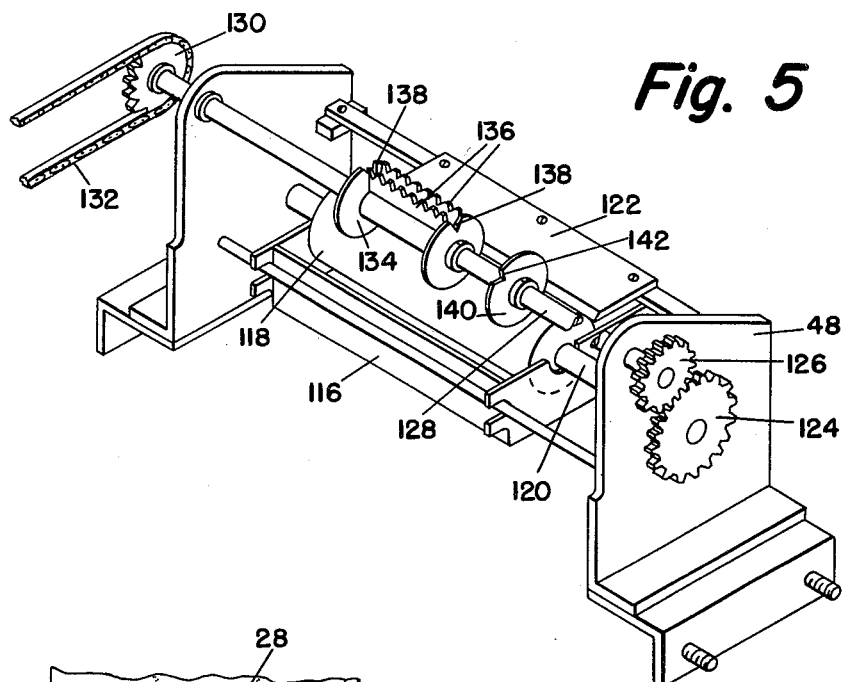
FIG. 5 is an enlarged, detailed perspective view of the adhesive applying means.

The strip is fed by the rolls 74 and 76 over a tension roller 110, mounted on an arm 112, and then over a roller 114. From there the strip moves to an adhesive-applying means (see FIG. 5).

The adhesive-applying means comprises a trough 116 above which is rotatably mounted an adhesive-applier roll 118 mounted on a shaft 120. A doctor blade 122 is connected to one end of the trough 116 and is positioned to scrape excess adhesive off the roll 118 and back into the trough 116.

The shaft 120 is journaled in appropriate bearings in the frame 48 and is provided with a gear 124 adjacent one end, this gear 124 meshing with a smaller gear 126 on a shaft 128 also journaled in appropriate bearings in the frame 48 above the roll 118. The opposite end of a shaft 128 is provided with a sprocket 130 for driving the shaft, this sprocket being connected to a drive chain 132. Intermediate its ends, the shaft 128 is provided with a pair of spaced discs 134 between which are positioned two laterally-spaced toothed or corrugated plates 136. Each disc 134 is provided with a notch 138 in alignment with the space between the plates 136. Axially spaced from one of the discs 134 is a third disc 140 having a similar notch 142.

In operation, as the strip 28 passes over the aforesaid adhesive-applying means, adhesive will be transferred from the trough to the discs 134 and 140 and the teeth of plates 136 by the roll 118. In turn, the discs 134 apply two spaced lines of adhesive 144 (see FIG. 6), inwardly of each side of the strip to form the sides of what will eventually be the pockets, the teeth on the plates 136 will form a series of double rows of adhesive spots 146, and the disc 140 will apply a line of adhesive 148 along one edge of the strip. The strip is eventually severed between the rows 146 of each double pair so that one row defines the upper edge of one bag and the other row defines the bottom edge of the next adjacent bag. The adhesive line 148 forms the bond between the eventual longitudinal edges of the bags. The notches 138 in the discs 136 and the notch 142 in the disc 140 form gaps of adhesive corresponding to the space between plates 136. These gaps define the area of severance between successive bags.

After the strip 28 leaves the aforesaid adhesive-applying station it passes over the roller 150 and around a roller 152 which reverses its direction of movement. In its new reverse direction, the strip passes under a magazine 154 in which are vertically stacked a plurality of cards 156.

Figure 4:
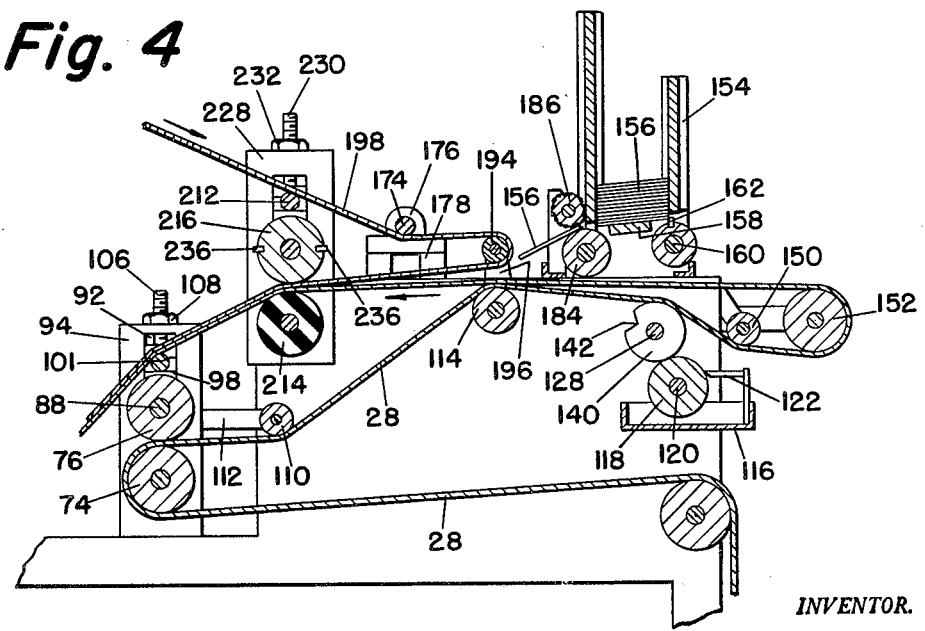
FIG. 4 is a view similar to FIG. 3 but taken from the opposite side of the machine.

The bottom of the magazine is only partially closed by a floor 158 (see FIG. 4), there being a slot on opposite sides of this floor and extending up along the sides for the thickness of a little more than one card.

At one side and underneath the magazine is rotatably mounted a roller 160 provided with a radial blade or finger 162 having a radial extent equal to the thickness of one card. As the roller 160 rotates, the blade 162, once during each revolution, engages the edge of the bottom-most card in the magazine and as the blade continues to rotate, it pushes this card through the opposite slot in the magazine.

The roller 160 is driven by a gear 164 coaxially connected to a sprocket 166. The gear 164 is in mesh with another gear 168 coaxially connected to a sprocket 170. The sprocket 170 is connected by an endless chain 172 to a sprocket (not shown) mounted on a shaft 174 extending between bearings 176 on support 178. The shaft 174 also supports a sprocket 180 which is connected by an endless chain 182 to a sprocket coaxial with and operatively connected to gear 78. The gear 78 is driven by gear 80 on main shaft 54 as described above. The shaft 174 also supports a sprocket (not shown) to which is connected the drive chain 132 for driving the sprocket 130 on shaft 128.

The bottom card 156, after being pushed out of the magazine, as described above, passes between a resilient roller 184 and a knurled roller 186. The roller 184 is positively driven by means of a coaxial sprocket 188 connected by endless chain 190 to sprocket 164. An idler sprocket 192 acts as a tensioning means for the chain 190.

The rollers 184 and 186 grasp the card 156 between them and feed it onto the top surface of the strip 28 as it passes beneath a roller 194 rotatably mounted on a shaft held by a support 196 in spaced relation to the top surface of the strip 28.

The roller 194 serves as a direction reversing means for a pocket-forming strip 198 held on a reel 200 mounted for rotation between a pair of standards 202. As seen in FIG. 9, strip 198 is narrower than strip 28. The reel 200 is mounted on a shaft 204 which is provided with an adjustable drag-forming means including clamps 206, bolts 208 and wing nuts 210. This drag means functions in like manner to the similar drag means used for reel 12.

The strip 198, in moving from reel 200, passes over a shaft 212 and over the shaft 174, prior to moving around roller 194. From roller 194 it passes over the upper surface of strip 28 with the cards 156 thereon. Thereafter, both strips, with the cards therebetween, pass between a pair of rolls 214 and 216.

The roll 216 is held in position adjacent the roll 214 by means of cams 218 mounted on shaft 212 and each provided with a handle 220. The cams 218 are positioned between opposed bearing blocks 222 and 224 slidable in a vertical slot 226 in the corresponding bracket 228. A threaded rod 230 and lock nut 232 provide an adjustable limit stop against upward movement of the roll 216 which is urged upwardly by a spring 234 when the cam 228 is released. The roll 214 is constructed of resilient material, such as rubber or the like, while the roll 216 is constructed of rigid material.

Figure 6:
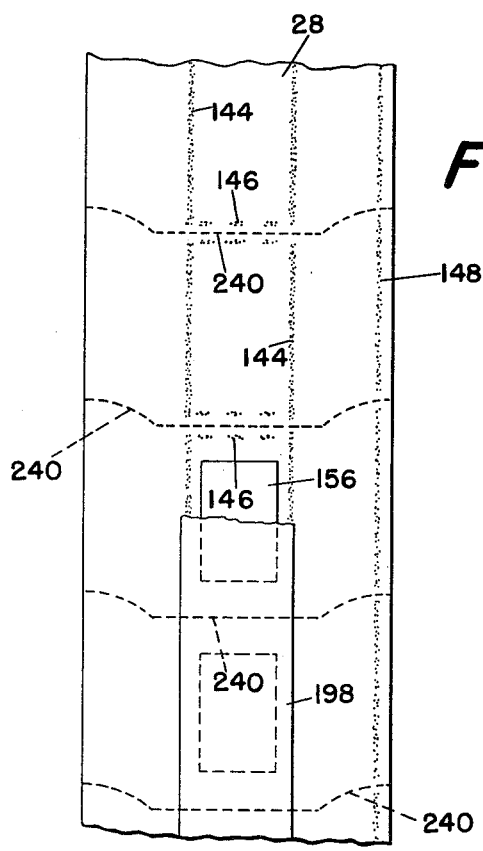
FIG. 6 is a top plan view of the strip after passing over the initial adhesive-applying station and over the serrating station.

The roll 216 is provided with two rows of teeth 236 spaced 180 degrees from each other around the outer circumference of the roll. Each row of teeth 236 includes a straight central portion and curved offset end portions 238 (as best seen in FIG. 7). This produces rows of serrations 240, of similar contour to the rows of teeth, between the rows of each pair of adhesive spots 146 (as best seen in FIG. 6).

The roll 216 is positively driven by means of a sprocket 242 (see FIG. 2) which is connected by an endless chain 244 to a sprocket 245 coaxial with gear 78. The chain 244 is held taut by a sprocket 246 mounted on a pivoted arm 247 which is biased by a spring 248.

After leaving the adhering and serrating station constituted by the rolls 214 and 216, the double ply strip (consisting of strips 28 and 198 with the cards 156 therebetween) passes over the shaft 101 and to a forming station (best shown in FIGS. 8 and 9). At this forming station is provided a shoe 249 which is mounted on a standard 250. This standard 250 is provided with a supporting sleeve 252, at its upper end, which is supported by a transverse shaft 254 connected to the standards 202. The shaft 254 supports oppositely disposed rotatably and slidably adjustable bearings 256 from each of which depends an arm 258. Rotatably mounted at the lower end of each arm 258 is a guide roller 260. These rollers 260 laterally guide and support the double ply strip (as best seen in FIG. 8).

Supported above the shoe 249 by a strip 262 (see FIG. 9) and in parallel relation thereto is a second shoe 264. Between the shoes 249 and 264 and at each side thereof are oppositely-disposed plates 266 extending partially toward each other. Each plate 266 is supported on the frame by posts 268 or the like.

A pair of guide wires 269, one positioned in advance of the other, are connected at opposite ends to the frame, as by means of screws 271. These guide wires serve to successively fold the two opposite edges of the strip 28 into overlapping position.

Each plate 266 supports a bearing bracket 270 on its top surface and in each bearing bracket is a pin 272 which pivotally supports an arm 274. Each arm 274, in turn, supports a presser roll 276, these presser rolls being inclined towards each other. Also mounted on the top surface of one of the plates 266 is a support 278 on which is mounted a transversely extending wire 280.

In the functioning of the forming apparatus illustrated in FIGS. 8 and 9, the two-ply strip passes under the foot 249 while being laterally guided by rollers 260. As the strip passes the plates 266, it is longitudinally folded over the upper shoe 264 and is simultaneously tucked in at either side to form pleats (see FIG. 9). At the same time, the wire 280 holds down one longitudinal edge of the folded strip while the other edge falls into overlapping position thereon (see FIG. 9). The longitudinally folded and pleated strip then passes under the presser rolls 276. These presser rolls, by being canted or inclined provide both vertical and horizontal vector force components whereby the overlapped longitudinal edges are forced together into adhesively-secured relationship and, at the same time, the pleats at either side are squeezed flat.

Figure 10:
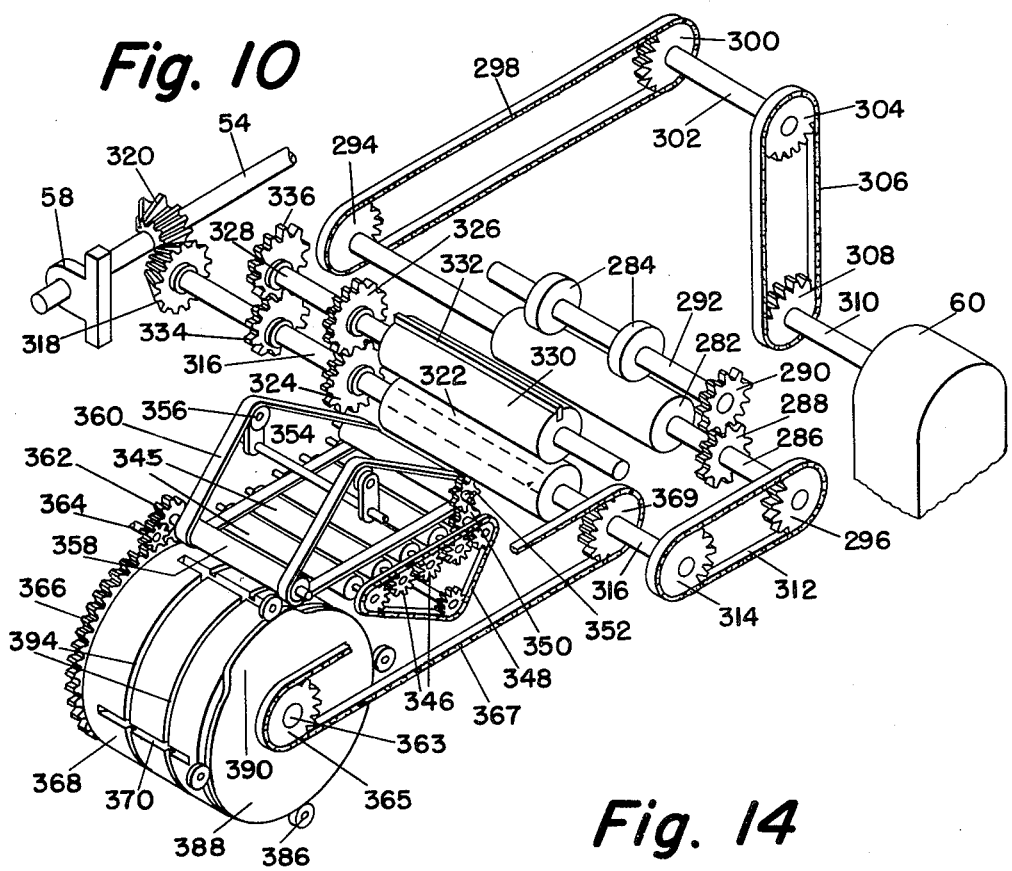
FIG. 10 is an enlarged, detailed perspective view, with parts omitted, of the bag separator and feed means.

After the strip has left the forming station, it passes between feed means comprising a lower roller 282 and upper discs 284. The roller 282 is mounted on a shaft 286 coaxially with a gear 288 (as best shown in FIG. 10). The gear 288 is in mesh with a gear 290 mounted on a shaft 292 which also supports the discs 284. The gears 288 and 290, as is apparent, serve to rotate the roller 282 and discs 284 in unison.

The shaft 286 is further provided with a sprocket 294 on one end and with a second sprocket 296 on the opposite end. The sprocket 294 is connected by an endless chain 298 to a sprocket 300 mounted on a shaft 302. The shaft 302 is also provided with a sprocket 304 which is, in turn, connected by an endless chain 306 to a sprocket 308. The sprocket 308 is mounted on the motor shaft 310 of motor 60.

The gear 296 is connected by an endless chain 312 to a sprocket 314 mounted on a shaft 316 (see FIG. 10). The shaft 316 is also provided, at its opposite end, with a bevel gear 318 in mesh with a bevel gear 320 on the main drive shaft 54.

Loosely mounted on the shaft 316 is a roller 322 having a gear 324 attached to one end. This gear 324 is in mesh with a gear 326 on a shaft 328 on which is mounted a roller 330 having a radially extending breaker blade or plate 322.

The roller 330 is spaced from the roller 322 a distance approximately equal to the width of the blade 332, the purpose here being to bring the blade 332 down against the strip adjacent the serrations 240 so as to apply a pull on the strip sufficient to cause the strip to tear apart at the weakened lines of serrations.

In order to effectively obtain the aforesaid pull, the roller 330 is rotated at a variable speed to provide a maximum and a minimum speed during each period of rotation. At its maximum speed, it is travelling faster than the strip and this faster rate provides the frictional differential causing the pull. At the same time, it is necessary to maintain the action of the breaker synchronized with the linear rate of feed of the strip so as to apply the breaking or tearing force at intervals corresponding to the serrations 240. This is accomplished by means of the eccentric gears 334 and 336 mounted respectively on shafts 316 and 328. By using this eccentric gear drive with the size and rotation of the gears proportioned to the intervals between serrations in the strips the rotational speed of the gears is maintained equal to the rotational speed of the feed rolls and discs 282 and 294 so that the blade comes into striking position at the predetermined intervals. At the same time, the maximum striking speed is provided at these same intervals.

Figure 14:
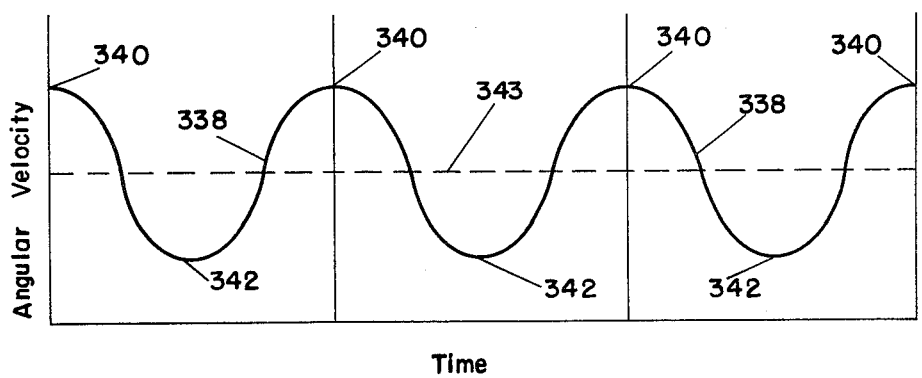
FIG. 14 is a graphic illustration of the variable speed of the bag separating mechanism relative to the linear speed of the strip.

The above eccentric gear drive is illustrated in the graph of FIG. 14 where the curve 338 shows a sine wave effect whereby the maximum speeds are indicated at 340 and the minimum speeds are indicated at 342 while the constant velocity of the moving strip is shown at 343.

After the individual bags 344 (see FIG. 15) have been severed from the strip, they are fed along by a conveying means comprising a series of rollers 345 having sprockets 346 at one end which are driven by an endless chain 348. A gear 350 on one end roller 346 meshes with a gear 352 on an upper roller 354. This roller 354 combines with upper rollers 356 and 358, set in triangular arrangement with each other, to support a pair of laterally spaced endless belts 360 which move linearly due to the positive drive of roller 354. The belts 360 frictionally engage the upper surfaces of the bags to move the bags along.

The drive for the aforesaid conveyer assembly is provided by a gear 362 on one end of the end roller 345 opposite that provided with gear 350. The gear 362 meshes with gear 364 which, in turn, meshes with a gear 366 on a drum 368.

Figure 11:
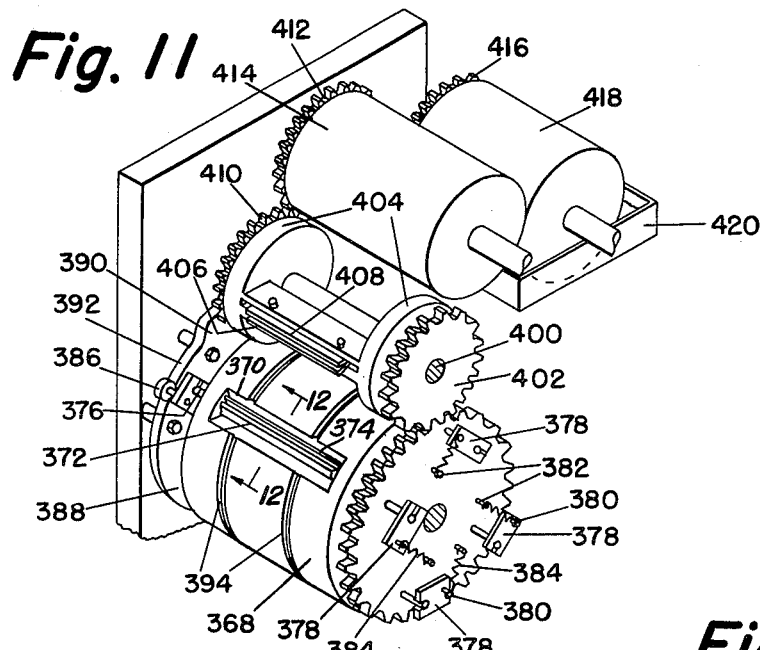
FIG. 11 is an enlarged, detailed perspective view of the bag and sealing means.

The drum 368 is part of an end closing assembly which acts to fold over and seal one end of the bag to complete the contruction of the bag. This apparatus is best disclosed in FIGS. 11, 12 and 13.

Figure 12:
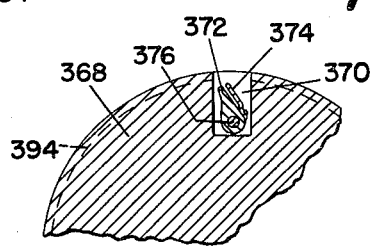
FIG. 12 is a sectional view taken on line 12—12 of FIG. 11.

The drum 368 is mounted on a shaft 363 having a sprocket 365 connected by an endless chain 367 to a sprocket 369 on the shaft 316. The drum itself is provided with longitudinal slots 370 on its periphery and in each of these slots there is positioned a blade 372 extending substantially the length of the corresponding slot 370. The blade 372 is provided with a spring plate 374 along its length and a shaft 376 passes longitudinally through the blade and through the opposite ends of the drum. At one end, the shaft 376 is held in a clamping bracket 378 provided with a pin 380. Between the pin 380 and a pin 382 on the drum is positioned a spring 384. The spring 384 serves to bias the shaft, and consequently the blade 372, in the counterclockwise direction whereby it acts to maintain the blade 372 in the open position spaced from the rear wall of the slot (as best seen in FIG. 12).

At its opposite end, the shaft 376 is provided with a cam follower 386 coacting with a cam disc 388 on the frame of the machine. During rotation of the drum 368, the cam follower 386 will act to close the blade 372, against the force of spring 384, when the follower rides over the high portion 390 of the cam disc, and will permit the spring to open the blade when it rides over the low portion 392.

Figure 13:
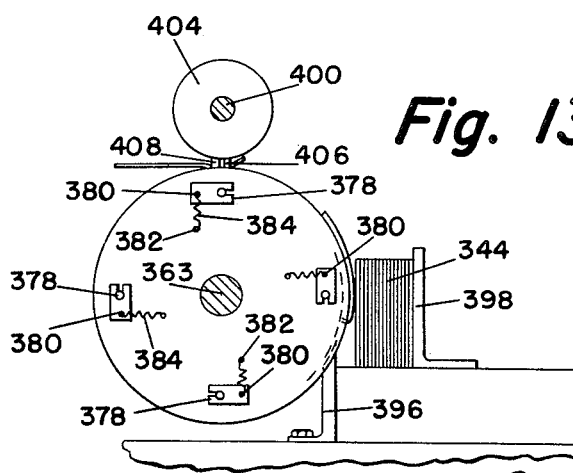
FIG. 13 is a cross-sectional view of the holding drum, folding and adhesive-applying means and stripper means of FIG. 11, these parts being shown operatively functioning together with a bag-stacking device.

Extending from the rear wall of the slot 370 and passing around the periphery of the drum are two laterally spaced grooves 394. These grooves coact with a pair of stripper fingers 396 mounted on the frame below the drum 368. These stripper fingers extend into their corresponding grooves 394 behind a bag 344 held on the periphery of the drum 368, and as the drum continues to rotate, the completed bags are stripped from the drum and stacked in a horizontal stack between the drum and a movable weight 398 (as best seen in FIG. 13). The weight may be spring-biased against the stack of bags if desired.

The completion of the bags while held on the drum 368 is accomplished by means of a mechanism which includes a shaft 400 having a gear 402 at one end in mesh with the gear 366 on the shaft 368. The shaft 400 is provided with a pair of spaced discs 404 between which are positioned a radially extending folder blade 406 and a radially extending adhesive-applicator blade 408. The two blades 406 and 408 are closely adjacent and parallel but are spaced from each other (as best seen in FIG. 13). The blade 406 is also of somewhat greater radial extent than the blade 408.

The shaft 400 is driven by the gears 366 and 402 and, in turn, is provided with a drive gear 410 on the opposite end from gear 402. The gear 410 is in mesh with a gear 412 on a transfer roll 414. The gear 412 is also in mesh with a gear 416 on an adhesive pick-up roll 418. The roll 418 rotates through an open trough 420 which holds glue or similar adhesive material.

In the operation of the aforedescribed assembly, the roll 418 picks up adhesive from the trough 420 and applies it to the transfer or applicator roll 414. The roll 414 transfers the adhesive to the blade 408. As the shaft 400 and drum 368 rotate with the blade 372 in open position, first the blade 406 contacts the end of a bag on the periphery of the drum 368 and tucks it into the slot 370 forming an open fold (as best seen in FIG. 13). Then, immediately thereafter, the blade 408 enters the open fold and applies a coating of adhesive therein. During this time, the discs 404 serve to laterally guide and position the bag. As the blades 406 and 408 move out of the slot during continued rotation, the follower 386 rides up on the high portion 390 of the cam disc 388 and acts to close the blade 372. This results in a compression of the adhesive-coated fold in the bag between the spring 374 and the rear wall of the slot 374. The spring 374 is utilized because its inherent resilience permits the blade 372 and slot 370 to operate efficiently even when the tolerances are not too fine. If the spring were not used, the parts would have to be constructed with fine tolerances to obtain a complete and uniform adherence of the edges to the fold in the bag.

After the fold in the end of the bag has been formed and sealed in the above manner, the cam follower again moves onto the low portion 392 of the cam and the blade 372 is opened, thereby permitting the bag to be stripped from the drum stacked in the manner described above.

Although this invention has been specifically described with respect to forming a pocketed bag with a sealed-in insert, the insert deposit means herein described can be used on substantially any bag, package, container, or packaging material. For instance, it can be used on bags having no side pleat. It also finds utility in machines which form bags, fill them and seal them in one continuous operation.

Likewise, a sealed-in insert can be placed on the exterior of a cardboard carton by using the insert deposit means of this invention.

In this case, the carton blank would first have applied to one surface thereof the glue pattern 114 from the glue rollers 146 (see FIG. 6). The insert would then be deposited within this pattern from magazine 154. The insert would then be covered by a portion of strip 198 which is subsequently pressed against the glue pattern. In this connection, it should be obvious that appropriate conveying rollers would be supplied and an appropriate knife positioned adjacent strip 198 to cut a portion thereof sufficiently large to cover the insert and glue pattern. An appropriate method and apparatus for cutting portions of strip 198 is shown in United States Patent No. 2,958,437.

It is thus apparent that the insert deposit means and method of this invention can be used for applying sealed-in inserts to substantially any container, package, or article on which a glue pattern can be applied. The insert can be deposited before, after, or during the formation of the container.

Obviously, therefore, many modifications and variations of the present invention are possible in the light of the above teachings. It is, therefore, to be understood that within the scope of the appended claims, the invention may be practiced otherwise than as specifically described.

What is claimed as the invention is:

1. A machine for forming pocketed bags with removable sealed inserts comprising, in operative connection with each other, a main supply reel having a strip coiled thereon, feed means for moving said strip to a bag forming assembly, said bag forming assembly comprising a framework, an adhesive-applying means in said framework for applying adhesive to said strip in spaced pocket-forming patterns, insert-deposit means on said framework for depositing a series of individual inserts on said strip in spaced arrangement longitudinally of said strip and within said patterns, an auxiliary supply reel on said framework, feed means for feeding an auxiliary strip from said auxiliary reel into superimposed position relative to both said first-mentioned strip and the inserts positioned thereon, means for bonding said auxiliary strip to said first-mentioned strip along said pocket-forming patterns to seal said inserts within individual pockets, serrating means for serrating the pocketed strip between pockets, folding and pleating means on said framework for longitudinally folding said pocketed strip on opposite sides of said pockets and forming pleats at opposite sides of the folded strip, severing means on said framework for severing said pocketed strip along the serrations formed by said serrating means, thereby acting to form individual bags, and end sealing means to overlap and seal one end of said bags.

2. The machine of claim 1 wherein said folding and pleating means comprises a pair of shoe, one shoe overlying the other in spaced relationship therewith, a pair of pleat-forming plates, one on each side of said pair of shoes, said plates extending partially towards each other between said shoes, and means operatively associated with said folding and pleating means for overlapping one longitudinal edge of said strip over the other longitudinal edge thereof.

3. A machine for forming pocketed bags with sealed inserts comprising, in operative connection with each other, a main supply reel having a strip coiled thereon, feed means for moving said strip to a bag forming assembly, said bag forming assembly comprising a framework, an adhesive-applying means in said framework for applying adhesive to said strip in pocket-forming patterns, said adhesive-applying means for applying adhesive in a pocket-forming pattern comprising a plurality of discs coaxially mounted on a common shaft and spaced from each other longitudinally of said shaft, each of said discs having a corresponding notch on its periphery, a pair of spaced toothed plates extending between two of said discs, an adhesive transfer roll mounted on a second shaft for rotation in peripheral adjacency to said discs and plates, an open trough for containing adhesive, said roll being rotatable through said trough, means for removing excess adhesive from said roll and returning it to said trough, and means for rotating said shafts, insert-deposit means on said framework for depositing a series of inserts on said strip in spaced arrangement longitudinally of said strip and within said patterns, an auxiliary supply reel on said framework, feed means for feeding an auxiliary strip from said auxiliary reel into superimposed position relative to both said first-mentioned strip and the inserts positioned thereon, means for bonding said auxiliary strip to said first-mentioned strip along said pocket-forming patterns to seal said inserts within individual pockets, serrating means for serrating the pocketed strip between pockets, folding and pleating means on said framework for longitudinally folding said pocketed strip on opposite sides of said pockets and forming pleats at opposite sides of the folded strip, severing means on said framework for severing said pocketed strip along the serrations formed by said serrating means, thereby acting to form individual bags, and end sealing means to overlap and seal one end of said bags.

4. A machine for forming pocketed bags with sealed inserts comprising, in operative connection with each other, a main supply reel having a strip coiled thereon, feed means for moving said strip to a bag forming assembly, said bag forming assembly comprising a framework, an adhesive-applying means in said framework for applying adhesive to said strip in pocket-forming patterns, insert-deposit means on said framework for depositing a series of inserts on said strip in spaced arrangement longitudinally of said strip and within said patterns, said insert-deposit means comprising a magazine having a transverse slot at one end, said slot being defined by opposed side openings in the magazine, a first roller rotatably positioned adjacent one of said side openings and having a radial blade thereon positioned to engage an insert within said magazine at the corresponding end of the magazine and exert a force thereon pushing it out of the opposite side opening during rotation of said roller, a second roller rotatably arranged adjacent said opposite side opening in a position to receive an item pushed from said magazine, and a knurled roller rotatably mounted in peripheral adjacency to said second roller, said rollers being rotatively connected, an auxiliary supply reel on said framework, feed means for feeding an auxiliary strip from said auxiliary reel into superimposed position relative to both said first-mentioned strip and the inserts positioned thereon, means for bonding said auxiliary strip to said first-mentioned strip along said pocket-forming patterns to seal said inserts within individual pockets, serrating means for serrating the pocketed strip between pockets, folding and pleating means on said framework for longitudinally folding said pocketed strip on opposite sides of said pockets and forming pleats at opposite sides of the folded strip, severing means on said framework for severing said pocketed strip along the serrations formed by said serrating means, thereby acting to form individual bags, and end sealing means to overlap and seal one end of said bags.

5. A machine for forming pocketed bags with sealed inserts comprising, in operative connection with each other, a main supply reel having a strip coiled thereon, feed means for moving said strip to a bag forming assembly, said bag forming assembly comprising a framework, an adhesive-applying means in said framework for applying adhesive to said strip in pocket-forming patterns, insert-deposit means on said framework for depositing a series of inserts on said strip in spaced arrangement longitudinally of said strip and within said patterns, an auxiliary supply reel on said framework, feed means for feeding an auxiliary strip from said auxiliary reel into superimposed position relative to both said first-mentioned strip and the inserts positioned thereon, means for bonding said auxiliary strip to said first-mentioned strip along said pocket-forming patterns to seal said inserts within individual pockets, serrating means for serrating the pocketed strip between pockets, said serrating means comprising a pair of oppositely-disposed rotatably mounted rollers, one of said rollers being biased away from the other, a cam means operatively connected to said biased roller for retaining said biased roller in peripheral adjacency to the other roller, said other roller being resilient, and said biased roller having at least one row of teeth on the outer periphery, folding and pleating means on said framework for longitudinally folding said pocketed strip on opposite sides of said pockets and forming pleats at opposite sides of the folded strip, severing means on said framework for severing said pocketed strip along the serrations formed by said serrating means, thereby acting to form individual bags, and end sealing means to overlap and seal one end of said bags.

6. A machine for forming pocketed bags with sealed inserts comprising, in operative connection with each other, a main supply reel having a strip coiled thereon, feed means for moving said strip to a bag forming assembly, said bag forming assembly comprising a framework, an adhesive-applying means in said framework for applying adhesive to said strip in pocket-forming patterns, insert-deposit means on said framework for depositing a series of inserts on said strip in spaced arrangement longitudinally of said strip and within said patterns, an auxiliary supply reel on said framework, feed means for feeding an auxiliary strip from said auxiliary reel into superimposed position relative to both said first-mentioned strip and the inserts positioned thereon, means for bonding said auxiliary strip to said first-mentioned strip along said pocket-forming patterns to seal said inserts within individual pockets, serrating means for serrating the pocketed strip between pockets, folding and pleating means on said framework for longitudinally folding said pocketed strip on opposite sides of said pockets and forming pleats at opposite sides of the folded strip, severing means on said framework for severing said pocketed strip along the serrations formed by said serrating means, said severing means comprising a pair of peripherally adjacent rollers mounted on individual shafts, one of said rollers having a radially-extending blade on its outer periphery and being fixed to its shaft, the other roller having a gear connected directly thereto and being loose on its shaft, said gear being in mesh with a second gear mounted on the shaft of said first-mentioned roller, said shafts being each further provided with an additional gear, said additional gears being in mesh with each other and each being eccentrically connected to its respective shaft, and means for positively driving the shaft of one of said rollers, thereby acting to form individual bags, and end sealing means to overlap and seal one end of said bags.

7. A machine for forming pocketed bags with sealed inserts comprising, in operative connection with each other, a main supply reel having a strip coiled thereon, feed means for moving said strip to a bag forming assembly, said bag forming assembly comprising a framework, an adhesive-applying means in said framework for applying adhesive to said strip in pocket-forming patterns, insert-deposit means on said framework for depositing a series of inserts on said strip in spaced arrangement longitudinally of said strip and within said patterns, an auxiliary supply reel on said framework, feed means for feeding an auxiliary strip from said auxiilary reel into superimposed position relative to both said first-mentioned strip and the inserts positioned thereon, means for bonding said auxiliary strip to said first-mentioned strip along said pocket-forming patterns to seal said inserts within individual pockets, serrating means for serrating the pocketed strip between pockets, folding and pleating means on said framework for longitudinally folding said pocketed strip on opposite sides of said pockets and forming pleats at opposite sides of the folded strip, severing means on said framework for severing said pocketed strip along the serrations formed by said serrating means, thereby acting to form individual bags, and end sealing means to overlap and seal one end of said bags, said end sealing means comprising a rotatable drum mounted on a shaft, a gear on one end of said shaft, said gear being in opertive connection with a drive gear, a longitudinal slot on the outer periphery of said drum, an auxiliary rotatable shaft extending longitudinally of said slot, means for biasing said auxiliary shaft in one direction of rotation, a cam follower on one end of said auxiliary shaft, a cam plate on said framework, said cam follower being in operative engagement with said cam plate, a gripper blade mounted on said auxiliary shaft within said slot, a spring plate on said gripper blade, a third shaft spaced from said drum, means for driving said third shaft in synchronism with said drum, a pair of radially extending, spaced, parallel blades on said third shaft, one of said parallel blades constituting a folder blade and the other an adhesive-applicator blade, means for applying adhesive to said adhesive-applicator blade and said parallel blades being arranged to successively enter and leave said slot in said drum during rotation thereof relative to said drum.

8. The machine of claim 7 wherein said drum is provided with at least one peripheral groove intersecting said slot, and a stripper means on said framework adjacent said drum, said stripper means being constructed and arranged to enter said groove behind a bag held on said drum during rotation of said drum.

9. A method of forming pocketed bags with removable sealed inserts which comprises applying a series of individual inserts to a first strip in such manner that said inserts are in spaced relationship to each other longitudinally of said strip, applying adhesive to said strip in a pocket-forming pattern around each insert, superimposing a second strip, narrower than said first strip, onto said first strip and in overlying relation to said inserts, bonding said strips together in conformity with said pattern to form a double-layer strip enclosing said inserts, serrating the resultant double-layer strip between the spaced inserts to form serrations therein, longitudinally folding said first strip on each side of said second strip to thereby cover said second strip with the folded portions of said first strip pleating the longitudinal edges on each side of the resultant folded double-layer strip, overlapping and sealing the longitudinal edges of said folded and pleated double-layer strip, severing said double-layer strip at the serrations to form individual bags, and overfolding and sealing one end of each of said individual bags.

10. A method of forming pocketed bags with removable sealed inserts which comprises continually applying adhesive to a first strip in spaced pocket-forming patterns, applying a series of individual inserts to said strip, with one of said inserts being applied within each pocket forming pattern, superimposing a second strip, narrower than said first strip, onto said first strip and in overlying relation to said inserts, bonding said strips together in conformity with said pattern to form a double-layer strip between the spaced inserts to form serrations therein, longitudinally folding said first strip on each side of said second strip, to thereby cover said second strip with the folded portions of said first strip, pleating the longitudinal edges on each side of the resultant folded double-layer strip, overlapping and sealing the longitudinal edges of said folded and pleated double-layer strip, severing said double-layer strip at the serrations to form individual bags, and overfolding and sealing one end of each of said individual bags.

11. A machine for placing removable sealed inserts on an article comprising means for supporting said article, said support means being on a framework, an adhesive applying means in said framework for applying adhesive to said article in spaced pocket-forming patterns, said adhesive applying means comprising a plurality of discs coaxially mounted on a common shaft and spaced from each other longitudinally of said shaft, each of said discs having a corresponding notch on its periphery, a pair of spaced, toothed plates extending between two of said discs, an adhesive transfer roll mounted on a second shaft for rotation in peripheral adjacency to said discs and plates, an open trough for containing adhesive, said roll being rotatable through said trough, means for removing excess adhesive from said roll and returning it to said trough, and means for rotating said shafts, insert-deposit means on said framework for depositing an individual insert within each of said patterns, a supply roll on said framework, feed means for feeding a strip from said supply roll into a superimposed position relative to said article and the insert positioned thereon, and means for bonding said auxiliary strip to said article along said pocket-forming pattern to seal said insert within an individual pocket.

12. A method of placing removable sealed inserts on material used for packaging items comprising depositing a series of inserts on said material while conveying said material, applying adhesive to said material in spaced pocket-forming patterns around each insert, superimposing at least one strip onto said material and in overlying relation to said inserts, bonding said strip to said material in conformity with said patterns to form pockets enclosing said inserts, and forming said material into an item-receiving condition.

13. A method of placing removable sealed inserts on material used for packaging items comprising continually applying adhesive to said material in spaced pocket-forming patterns while conveying said material, depositing a series of inserts on said material within said pocket-forming patterns, superimposing at least one strip onto said material and in overlying relation to said inserts, bonding said strip to said material in conformity with said patterns to form pockets enclosing said inserts and forming said material into an item-receiving condition.

References Cited in the file of this patent

UNITED STATES PATENTS

| | | |
|---|---|---|
| 600,844 | Russell | Mar. 15, 1898 |
| 1,976,513 | Poppe | Oct. 9, 1934 |
| 2,260,064 | Stokes | Oct. 21, 1941 |
| 2,347,902 | Gaubert | May 2, 1944 |
| 2,525,651 | Clunan | Oct. 10, 1950 |
| 2,958,437 | Mengis | Nov. 1, 1960 |